United States Patent
Klassen

(10) Patent No.: US 9,500,245 B2
(45) Date of Patent: Nov. 22, 2016

(54) SPRINGS FOR SHOES

(75) Inventor: James B. Klassen, Langley (CA)

(73) Assignee: Powerdisk Development Ltd., Calgary (CA)

( * ) Notice: Subject to any disclaimer, the term of this patent is extended or adjusted under 35 U.S.C. 154(b) by 945 days.

(21) Appl. No.: 13/380,495

(22) PCT Filed: Jun. 22, 2010

(86) PCT No.: PCT/CA2010/000929
§ 371 (c)(1),
(2), (4) Date: Mar. 19, 2012

(87) PCT Pub. No.: WO2010/148485
PCT Pub. Date: Dec. 29, 2010

(65) Prior Publication Data
US 2012/0159810 A1    Jun. 28, 2012

Related U.S. Application Data

(60) Provisional application No. 61/230,370, filed on Jul. 31, 2009, provisional application No. 61/219,038, filed on Jun. 22, 2009.

(51) Int. Cl.
*A43B 13/28* (2006.01)
*F16F 1/32* (2006.01)
(Continued)

(52) U.S. Cl.
CPC ............... *F16F 1/32* (2013.01); *A43B 13/181* (2013.01); *A43B 13/42* (2013.01); *F16F 1/324* (2013.01)

(58) Field of Classification Search
USPC ..... 36/25 R, 27, 28, 35 R, 37, 103; 267/152, 267/153, 160–162, 164
See application file for complete search history.

(56) References Cited

U.S. PATENT DOCUMENTS 1,613,538 A    1/1927   Schad
1,726,028 A    8/1929   Keller
(Continued)

FOREIGN PATENT DOCUMENTS

CA    2024402 A1    8/1990
CA    2206433 A1    11/1995
(Continued)

OTHER PUBLICATIONS

International Search Report with Written Opinion mailed Oct. 19, 2010, issued in corresponding International Application No. PCT/CA2010/000929, filed Jun. 22, 2010, 10 pages.
(Continued)

*Primary Examiner* — Christopher Schwartz
(74) *Attorney, Agent, or Firm* — Christensen O'Connor Johnson Kindness PLLC

(57) ABSTRACT

A spring for a spring shoe, the spring including a conical disk, the conical disk having a flexible flange around the perimeter of the conical disk. A spring comprising a conical disk and a ring spring around the conical disk, the ring spring being movable up and down relative to the conical disk to adjust the spring force of the spring. A threaded engagement between the ring spring and the conical disk so that rotation of the conical disk moves the ring spring up or down relative to the conical disk. A damper ring around the perimeter of the conical disk to resist the expansion of the circumference of the conical disk. An eccentric ring or cam to adjust the position of the apex of the conical disk relative to an insole by rotating the eccentric ring or cam. An asymmetric conical disk to adjust the position of the apex of the conical disk by rotating the conical disk. A damper for a spring shoe comprising a flexible container containing a material with little or no propensity to return to its original shape. A spring array for a spring shoe, the springs of the spring array having (Continued)

a reducing force resisting compression over at least a portion of the spring range of travel as the spring compresses, and there being a damper associated with the array to oppose compression of the array towards maximum compression.

5 Claims, 6 Drawing Sheets

(51) Int. Cl.
*A43B 13/18* (2006.01)
*A43B 13/42* (2006.01)

(56) References Cited

U.S. PATENT DOCUMENTS

| | | | |
|---|---|---|---|
| 2,079,346 A * | 5/1937 | Golden | 16/86 A |
| 2,408,617 A | 10/1946 | Ferrar | |
| 2,630,897 A | 3/1953 | Porter | |
| 3,029,071 A | 4/1962 | Wells | |
| 3,107,766 A | 10/1963 | Pritchard | |
| 3,268,199 A * | 8/1966 | Kordyban et al. | 220/632 |
| 3,323,764 A * | 6/1967 | Johnson | 267/140.4 |
| 3,489,402 A | 1/1970 | Cobley | |
| 4,342,158 A * | 8/1982 | McMahon et al. | 36/35 R |
| 4,492,046 A | 1/1985 | Kosova | |
| 4,592,153 A | 6/1986 | Jacinto | |
| 4,638,575 A | 1/1987 | Illustrato | |
| 4,680,876 A | 7/1987 | Peng | |
| 4,843,737 A | 7/1989 | Vorderer | |
| 4,894,934 A | 1/1990 | Illustrato | |
| 4,967,734 A | 11/1990 | Rennex | |
| 5,282,325 A | 2/1994 | Beyl | |
| 5,343,637 A | 9/1994 | Schindler | |
| 5,367,790 A | 11/1994 | Gamow | |
| 5,435,079 A | 7/1995 | Gallegos | |
| 5,918,384 A * | 7/1999 | Meschan | 36/37 |
| 6,029,374 A | 2/2000 | Herr | |
| 6,050,557 A | 4/2000 | Shimoseki | |
| 6,282,814 B1 | 9/2001 | Krafsur | |
| 6,434,859 B1 | 8/2002 | Kim | |
| 6,553,692 B1 | 4/2003 | Chung | |
| 6,684,531 B2 | 2/2004 | Rennex | |
| 6,964,120 B2 * | 11/2005 | Cartier et al. | 36/29 |
| 6,996,922 B2 | 2/2006 | Ryoo | |
| 6,996,924 B2 | 2/2006 | Meschan | |
| 7,089,690 B2 | 8/2006 | Krstic | |
| 7,219,449 B1 | 5/2007 | Hoffberg | |
| 7,228,648 B2 * | 6/2007 | Yang | 36/35 R |
| 7,278,226 B2 | 10/2007 | Holden | |
| 7,290,354 B2 | 11/2007 | Perenich | |
| 7,401,419 B2 | 7/2008 | Lucas | |
| 7,726,042 B2 | 6/2010 | Meschan | |
| 7,757,411 B2 | 7/2010 | Nakano | |
| 7,937,853 B2 | 5/2011 | Kwon | |
| 7,950,166 B1 | 5/2011 | Perenich | |
| 2002/0022798 A1 | 2/2002 | Connelly | |
| 2002/0144430 A1 | 10/2002 | Schmid | |
| 2003/0121178 A1 | 7/2003 | Rennex | |
| 2003/0126760 A1 | 7/2003 | LeVert | |
| 2003/0188455 A1 | 10/2003 | Weaver, III | |
| 2003/0192200 A1 | 10/2003 | Dixon | |
| 2004/0068893 A1 * | 4/2004 | Kendall | 36/88 |
| 2004/0069589 A1 | 4/2004 | Pahrisch | |
| 2005/0005472 A1 | 1/2005 | Perenich | |
| 2005/0102858 A1 | 5/2005 | Yen | |
| 2005/0151310 A1 | 7/2005 | Rodeffer | |
| 2005/0241184 A1 * | 11/2005 | LeVert et al. | 36/27 |
| 2005/0262725 A1 | 12/2005 | Rennex | |
| 2006/0021262 A1 | 2/2006 | Killion | |
| 2006/0213082 A1 * | 9/2006 | Meschan | 36/27 |
| 2007/0119074 A1 | 5/2007 | Aveni | |
| 2007/0271818 A1 | 11/2007 | Rabushka | |
| 2007/0294915 A1 | 12/2007 | Ryu | |
| 2008/0016716 A1 | 1/2008 | Battaglino | |
| 2008/0256827 A1 | 10/2008 | Hardy | |
| 2008/0313928 A1 | 12/2008 | Adams | |
| 2009/0056165 A1 | 3/2009 | Lee | |
| 2010/0058616 A1 * | 3/2010 | Ryoo | 36/102 |
| 2010/0251571 A1 | 10/2010 | Woodard | |
| 2011/0107618 A1 * | 5/2011 | Kim | 36/38 |
| 2011/0314695 A1 | 12/2011 | Tsai | |
| 2012/0204442 A1 * | 8/2012 | Elnekaveh | 36/27 |

FOREIGN PATENT DOCUMENTS

DE 202006007302 U1 9/2006
WO 81/03602 A1 12/1981

OTHER PUBLICATIONS

Spira, "The Future is Now. WaveSpring™ Technology is here and it is coming to a shoe near you!" <www.spira.com/technology>, [retrieved Dec. 15, 2007].

Z-CoiL Footwear, "Z-CoiL® Footwear Gains ANSI and CSA Certification," <www.zcoil.com>, [retrieved Feb. 27, 2006].

* cited by examiner

SPRINGS FOR SHOES

BACKGROUND

Field springs, in particular springs used in shoes. It is common in human footwear to have a sole material which compresses to absorb impact energy when the mass of the user is transferred to the shoe during each foot strike. Energy is stored in the compression of the sole and then released back as a vertical force on the bottom of the user's foot. The force required to compress the sole must be high enough to decelerate the mass of the user while walking and/or running Due to the low travel of this "suspension system", the bounce frequency of a conventional spring will be higher than the natural frequency of the user's walking or running gait. This causes the energy to be returned at a higher frequency than is desirable. The inventor has proposed a solution to this problem in published U.S. application no. 2009-0064536 published Mar. 12, 2009. This patent document proposes further improvements to spring shoes.

SUMMARY

A sole of a shoe is provided comprising an outsole, an insole and a pocket in the outsole, a conical disk within the pocket, and a flange around the perimeter of the conical disk extending from the conical disk to a boundary of the fixed pocket to center the disk within the fixed pocket while the disk expands or contracts. In an embodiment, the flexible flange may act as a seal to prevent the flow of air into and out of the interior of the conical disk. In another embodiment, the flexible flange may be detented to rotationally position the conical disk within the fixed pocket.

A spring is also provided comprising a conical disk having a base and an apex and a ring spring around the perimeter of the conical disk, in which the ring spring is movable in a direction generally perpendicular to the base to adjust the spring force of the conical disk. In an embodiment, the ring spring may engage with the conical disk in a threaded manner so that the ring spring is movable in the direction generally perpendicular to the base by rotating the conical disk relative to the ring spring or the ring spring relative to the conical disk. In an embodiment, the ring spring may engage with an element radially outward from the ring spring in a manner which allows vertical movement and radial expansion of the ring spring but prevents rotational movement of the ring spring relative to the element. In a further embodiment where the ring spring engages with an element radially outward from the ring spring, the ring spring may engage with the element radially outward from the ring spring with tongue and groove slots. In an embodiment where the ring spring engages with an element radially outward from the ring spring, the element radially outward from the ring spring may be a damper ring.

A spring is also provided comprising a conical disk and a damper ring around the perimeter of the conical disk, in which when the conical disk is compressed the damper ring is caused to expand. In an embodiment, when the conical disk is compressed the damper ring may not be caused to expand until part way through the compression of the conical disk. In an embodiment, the creep modulus of the damper ring may be higher than the spring constant of the conical disk. In an embodiment, where there is also a ring spring, the creep modulus of the damper ring may be higher than the spring constant of the ring spring.

A spring is also provided comprising a conical disk having a base and an apex, a ring spring around the perimeter of the conical disk, in which the ring spring is movable in a direction generally perpendicular to the base to adjust the spring force of the conical disk, and a damper ring around the perimeter of the conical disk radially outward from the ring spring, the damper ring providing a damping resistance that varies depending on the position of the ring spring in the direction generally perpendicular to the base. In an embodiment, the damper ring may also have a cross sectional thickness that varies over the direction of movability of the ring spring.

A spring is also provided comprising a conical disk having a base and an apex, in which when the apex is pushed towards the base the spring provides an opposing force having a center of force, and means for changing the position of the center of force in a direction parallel to the base.

A spring is also provided for placement between the insole and the outsole of a shoe, the spring comprising a conical disk having a base and an apex, and an eccentric ring or cam that can be rotated to accomplish a change of position of the apex relative to the insole.

A biased damper and spring in combination is also provided, the damper comprising a flexible container and a deformable or fluid substance contained within the flexible container. In an embodiment the deformable or fluid substance may be a liquid, a slurry, a powder, or a deformable solid, and may in particular comprise polysiloxane-boron, silica particles suspended in polyethylene glycol, or a shear-thickening fluid. In an embodiment the flexible container may be an extensible container. In an embodiment where the container is extensible it may comprises polyurethane. In an embodiment the spring may comprise a conical disk and the biased damper may be placed to resist compression of the conical disk at or near full compression of the conical disk.

In any of the above embodiments where there is a damper ring the damper ring may comprise polyurethane. In any of the above embodiments where there is a damper ring the damper ring may be made of a combination of materials. In any of the above embodiments where there is a damper ring there may be one or more additional damper rings in which when the conical disk is compressed the damper rings begin to expand progressively during the compression of the conical disk.

A spring is also provided comprising a conical disk having a base and an apex, in which when the apex is pushed towards the base the spring provides an opposing force having a center of force, in which the conical disk is asymmetrical so that the conical disk that can be rotated to accomplish a change of the center of force position.

A spring array is also provided for a spring shoe having a sole, the spring array comprising an array of springs, each spring of the array of springs having a spring range of travel under compression of the spring by a foot supported by the spring array, each spring having a spring rate that varies with the compression of the respective spring to provide a reducing force resisting compression over at least a portion of the spring range of travel as the spring compresses, and a biased damper associated with the array of springs, the biased damper opposing compression of the array as the springs of the array compress towards maximum compression and the biased damper being external to the springs in the array. In an embodiment the springs may surround the biased damper.

A spring array is also provided for a spring shoe having a sole, the spring array comprising an array of springs, each spring of the array of springs having a spring range of travel under compression of the spring by a foot supported by the spring array, each spring having a spring rate that varies with the compression of the respective spring to provide a reducing force resisting compression over at least a portion of the spring range of travel as the spring compresses, and a biased damper associated with the array of springs, the biased damper opposing compression of the array as the springs of the array compress towards maximum compression and the springs of the array having spring rates that vary and depend on the location of the spring in the array. In an embodiment each spring may comprise at least a rigid member and an extensible member. In an embodiment the thickness of at least some of either or both of the extensible members and the rigid members may vary across the array. In an embodiment the rigid members and the extensible members may be made of the same material but the extensible members being thinner than the rigid members.

Logical combinations of any of the above embodiments may also be used. Any of the springs, dampers and spring and damper combinations may be used in a shoe comprising an outsole and an insole, and the spring, damper or spring and damper may be situated within either the outsole or insole or within both, as for example when situated between the outsole and insole.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
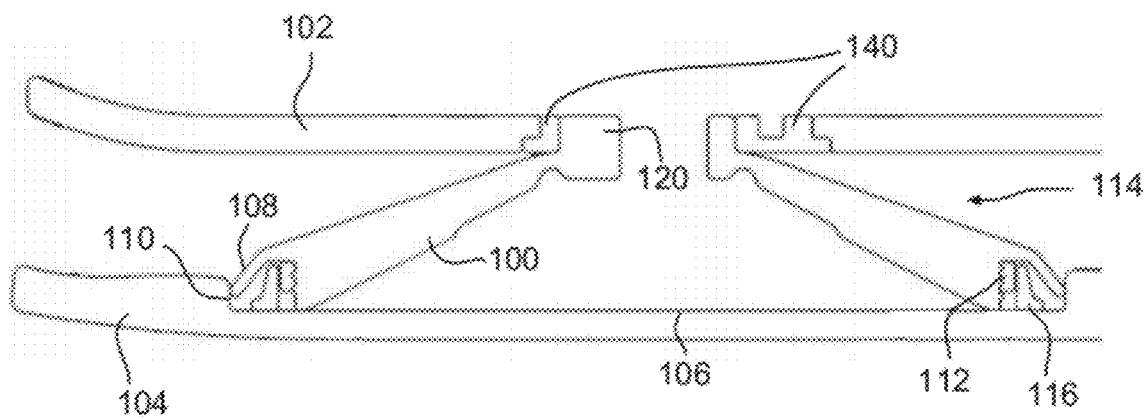
FIG. 1 is a side section view of a conical disk between an insole and an outsole, having a flexible flange, threaded ring spring, damper ring, and eccentric pronation/suponation adjustment.

Referring to FIG. 1, a side section view of an exemplary conical disk 100 is shown. The conical disk is shown here extending between an insole 102 and an outsole 104 of a shoe. In the embodiment shown the outsole defines a pocket 106. A flexible flange 108 around the perimeter of the disk allows the disk to compress while staying centered in a fixed pocket. This flange can be used to air seal the inside of the disk. It can also be used as a flexible detent member for rotational adjustment of the disk as described below. The flexible flange 108 extends between conical disk 100 and edge 110 of pocket 106 to keep the conical disk centered within the pocket.

Around the circumference of the conical disk 100 lies ring spring 112. The ring spring and the conical disk cooperate to act as a spring 114 with a spring rate that reduces when the spring is compressed. Compression of the sole of the shoe by moving the insole and outsole towards each other causes compression of the conical disk and expansion of the outer circumference of the conical disk. The expansion of the outer circumference of the conical disk is resisted by the material comprising the outer circumference of the conical disk and by the ring spring 112 to provide a spring force of the conical disk opposing the force compressing the conical disk.

Adjustment of the spring force may accomplished by moving the ring spring 112 (preferably made of Delrin or Pebax or some other highly elastic material) up or down relative to the conical disk 100. This gives the conical disk more mechanical advantage on the spring when the ring spring is in the uppermost position, or less mechanical advantage on the ring spring is in the downward most position. Any number of positions is possible in-between these extremes. In this way the vertical spring force of the assembly can be decreased by moving the spring ring up or increased by moving the ring spring down.

Vertical adjustment of the ring spring 112 can be accomplished by various means. A threaded engagement 118 is disclosed here as the preferred embodiment, most readily seen in FIG. 2. The preferred method of vertically moving the spring ring using a threaded engagement is to prevent the ring spring from rotating, and by rotating the conical disk. In this case, the flexible outer flange may be detented to provide positive engagement in predetermined positions. When the conical disk is in an uncompressed position as shown, the ring spring has the same diameter in an upper or lower position. When the conical disk is compressed, the ring spring is expanded to a greater diameter if it is in a lower position than if it is in an upper position, and thus the ring spring provides a greater force resisting the compression of the conical disk when it is a lower position than when it is an upper position.

Due to the reduction of spring force as the conical disk 100 compresses, in order to prevent the compression from becoming excessively abrupt towards maximum compression, it is desirable to provide a damper to resist compression towards maximum compression without providing such a force at maximum compression as would cause the spring to prematurely uncompress. The damper is designed to provide resistance to compression of the shoe sole for the portion of the user's mass and inertia which is not effectively opposed by the energy storage and return spring. The damper is biased so that it acts only or primarily during the compression phase of the shoe sole compression and rebound. During the rebound phase, the combination of the spring and damper allows the damper to return to its original shape more slowly, quickly enough so it is available to dissipate energy during the next foot strike, but not as quickly as the spring expands when the user heel begins to lift. The damper does not detract from the energy which is being returned to the user by the spring.

A new method is shown of achieving a compression biased damper which, in the preferred embodiment, is also adjustable. The basic concept of this new damper uses one or more additional rings 116 (only one shown) located around the outside of the ring spring (the ring spring may be a separate, and possibly adjustable ring, or it may be integrated into the perimeter of the conical disk (not shown here) or the conical disk may have enough spring force on its own provided by the flexible flange or some other feature or combination of features that the damper ring can be located around the perimeter of an interrupted section of the conical disk which has no or very little spring force characteristic. The damper ring 116 is preferably constructed of a material or combination of materials such as but not limited to polyurethane which has a high creep modulus or high hysteresis, or which is highly visco elastic (i.e. high viscosity) such that it provides significantly more resistance to expansion during compression when the disk is compressed in less than half a second than it provides energy return during contraction when the disk is allowed to expand in less than half a second. Polyurethane with a shore-A durometer of 70 or greater is believed to be adequate for the damper ring in many applications but other durometers and/or materials and/or combinations of materials may also be used. In this way the damper ring provides compression biased damping resistance to the conical disk when it is compressed.

The damper ring 116 may contact the conical disk 100 and/or ring spring 112 starting immediately during the compression phase, but it preferably fits loosely around the perimeter of the conical disk and/or ring spring so it does not begin to expand until the disk is partly compressed. Ideally, the damper ring is only forced to expand as the spring rate of the other components begins to drop off. In this way, a constant or increasing spring rate can be achieved during compression, but due to the hysteresis of the damper ring, the total vertical force of the disk and damper will fall off when the disk is at full compression so the disk can stay compressed during the mid stride. The compression resistance rate of the damper ring can be further refined by using one or more additional damper rings which begin to expand progressively through the compression of the conical disk.

Figure 2:
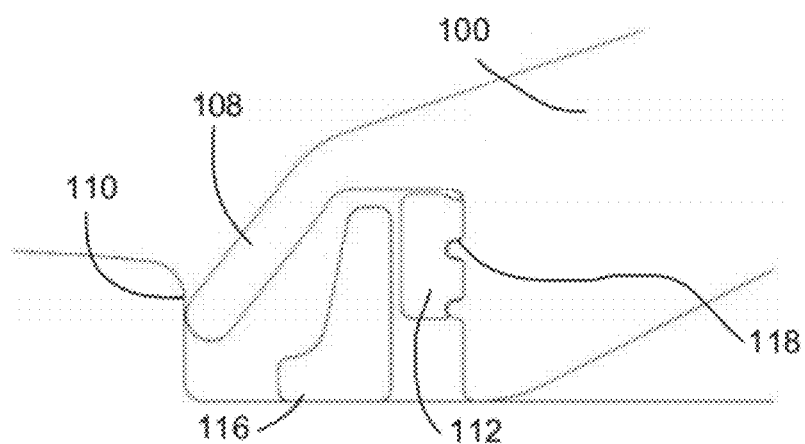
FIG. 2 is a detail section view of the adjustable ring spring and damper of FIG. 1 in an at-rest position.
Figure 5:
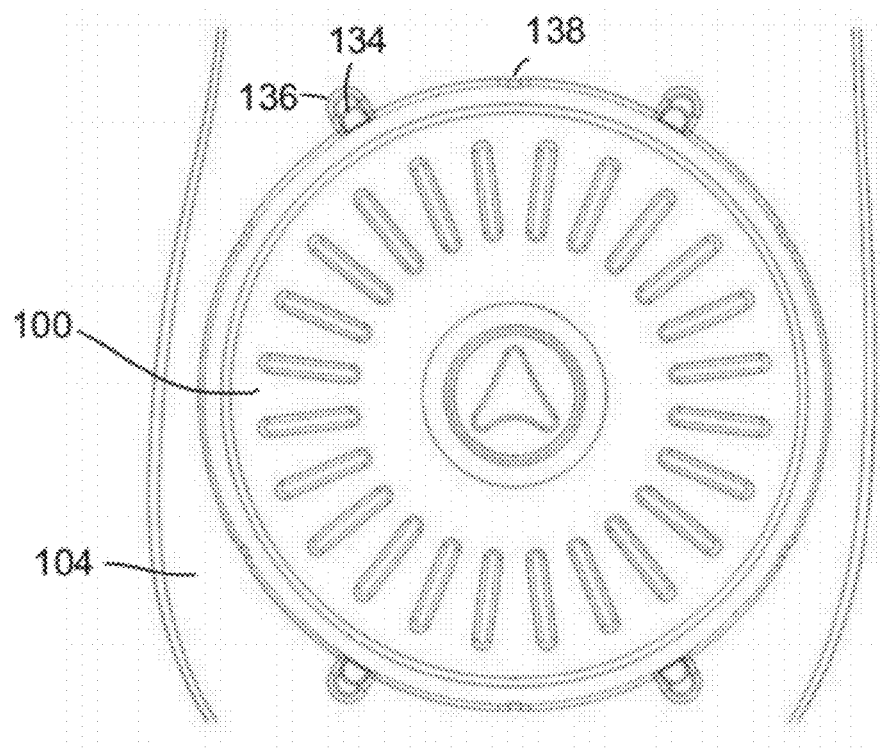
FIG. 5 is a top view of a disk in an outsole showing detentes.
Figure 6:
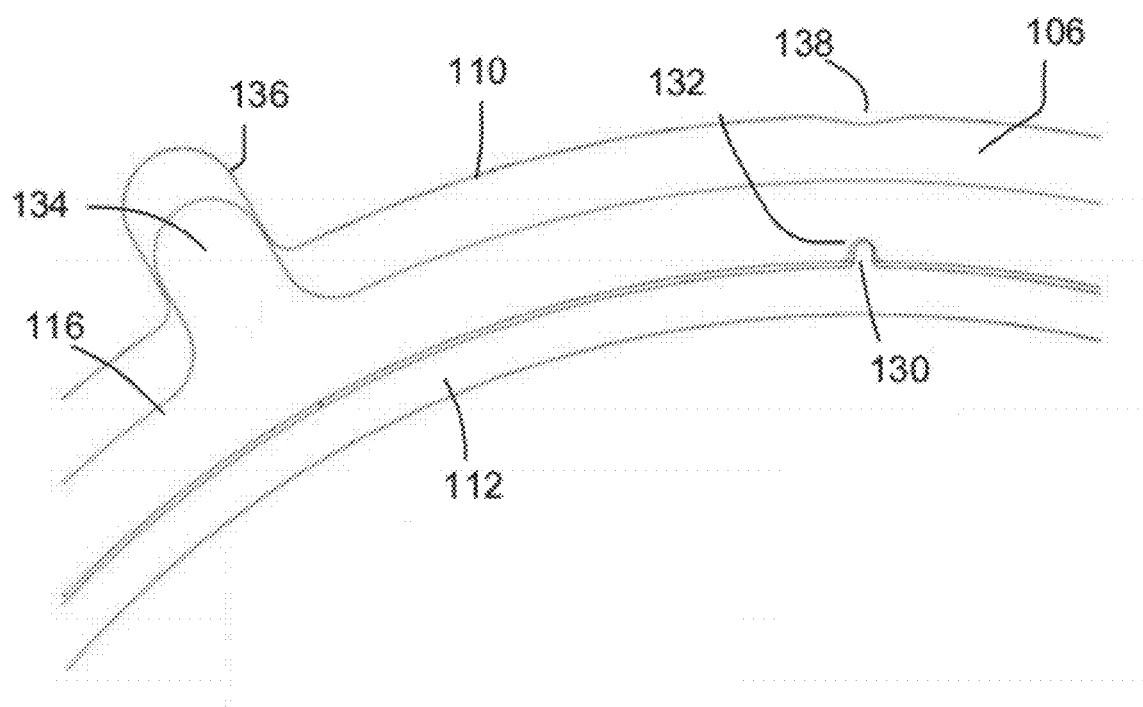
FIG. 6 is a top view of a portion of an adjustable ring spring with a damper ring

The force of the damper ring/s 116 may also be adjustable when used in combination with the threaded ring spring 112. In the preferred embodiment, the threaded ring spring is prevented from spinning via some means such as, but not limited to, the tongue and groove interface with the damper ring shown in FIG. 6 This interface allows the ring spring to move vertically but not to rotate. One or more tabs 130 of ring spring 112 fit into corresponding slots 132 in damper ring 116. If a damper ring is not used, or is not located immediately adjacent to the ring spring, then these tabs would be larger to allow radial expansion of the ring spring and may be positioned in slots in edge 110 of outsole pocket 106. The damper ring 116 (more than one can be used in series or parallel) is allowed to expand radially but is prevented from rotating by some means such as but not limited to a tongue and groove arrangement as also shown in FIG. 6. One or more tabs 134 of damper ring 116 extend into corresponding slots 136 in edge 110 of the outsole pocket 106. There may also be one or more detents 138 in the edge 110, and/or on the flexible flange 108, to provide positive rotational positioning of the conical disk. These features are also shown in FIG. 5 in the context of the whole conical disk 100 positioned within outsole 104. The damper ring can be in initial contact with the ring spring before compression of the conical disk, but it is preferably large enough in diameter to allow the conical disk to compress partially before the damper ring must begin expanding. When the ring spring is at the top (in the lightest user weight position) the ring spring only expands against the top part of the damper ring. The combination of increased mechanical advantage of the conical disk on the ring spring, and the fact that the ring spring must only flare the top of the damper ring, allows the damping in this position to be minimized. When the ring spring is at the bottom position (at the heaviest user weight position) the ring spring must expand the bottom section of the damper ring. The combination of decreased mechanical advantage of the conical disk on the ring spring, and the fact that the ring spring must stretch the thicker bottom part of the damper ring, allows the damping in this position to be maximized. The damper ring can be of a consistent cross sectional profile from top to bottom (or with a narrower cross section at the bottom than the top) but preferably has a larger cross section at the bottom than the top, as shown in FIGS. 1 and 2. This allows the damping to increase at a greater rate than the spring rate as the spring ring is threaded downward. It is believed by the inventors that higher damping rates will allow for a wider range of users than will higher spring rates. The advantage of increasing the damping at a greater rate than the spring rate is to allow greater variations in the spring/damping characteristics of the assembly. It is further believed that a damper ring that increases in cross sectional thickness exponential at the bottom will enable the best shoe performance over the widest range of user weights and uses.

Figure 3:
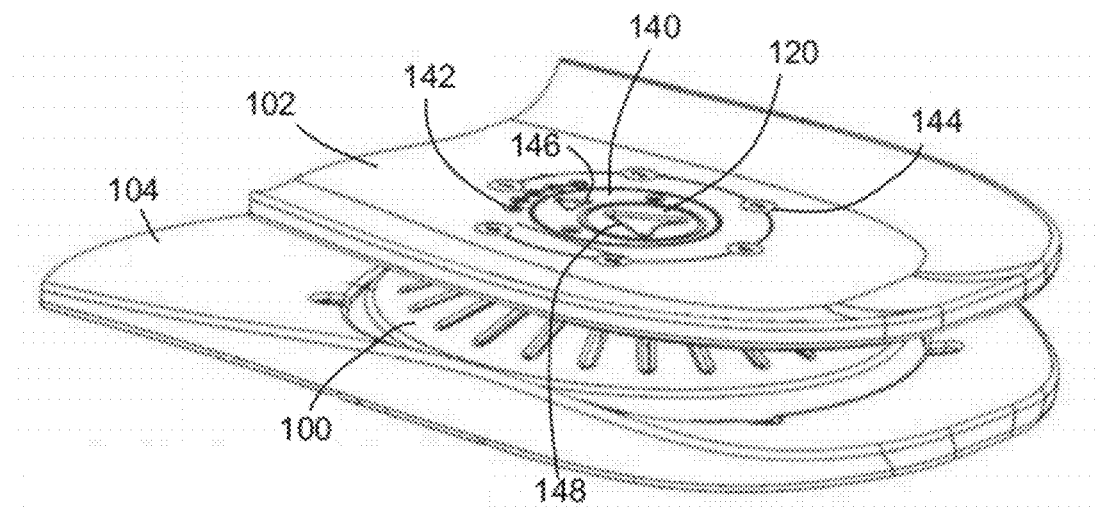
FIG. 3 is an isometric view of the disk of FIG. 1 between an insole and an outsole.
Figure 4:
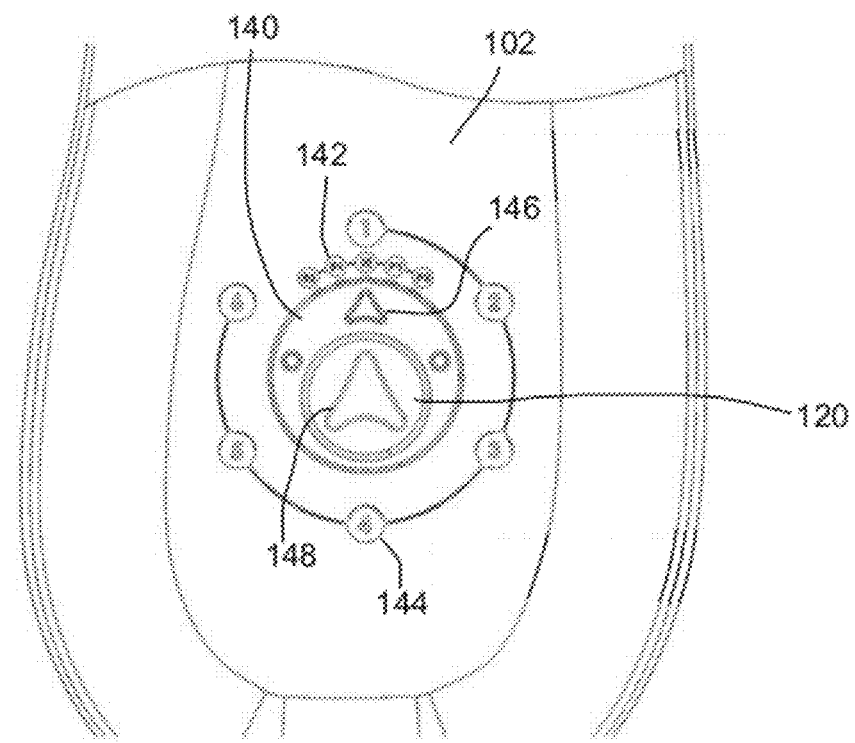
FIG. 4 is a top view of the disk of FIG. 1 in a shoe showing an inner rotation drive to adjust the spring and damping rate and an outer rotation drive to adjust for pronation and suponation.

Also disclosed are two methods of adjusting the PowerDisk for different users with regard to the tendency to pronate or suponate. The preferred embodiment uses an eccentric ring 140 at the apex 120 of the disk to move the position the disk apex laterally at various positions under the user's heal. The second method uses an asymmetric conical disk 150 design which can be positioned rotationally by the user to achieve different effects. Both of these methods can be combined with the adjustable ring spring and damper ring. A cross section of an eccentric ring 140 is visible in FIG. 1. FIG. 3 shows the eccentric ring in more detail in the context of a perspective view of a conical disk 100 between an insole 102 and an outsole 104. The position of the apex 120 of the disk 100 may be adjusted by rotating the eccentric disk 140 relative to the insole 102. FIG. 4 shows the embodiment of FIG. 3 from a top view. Also visible on the insole in this embodiment are a first set of markings 142 to aid the user in determining the rotation of the eccentric disk 140 and a second set of markings 144 to aid the user in determining the rotation of the conical disk 100 including its apex 120. Arrows 146 on the eccentric disk and 148 on the apex of the conical disk enable the user to determine the rotation of the disks by comparing the direction of the arrows with the markings The arrows may also be functional elements for example for engaging with a tool in order to rotate the respective disks.

Figure 7:
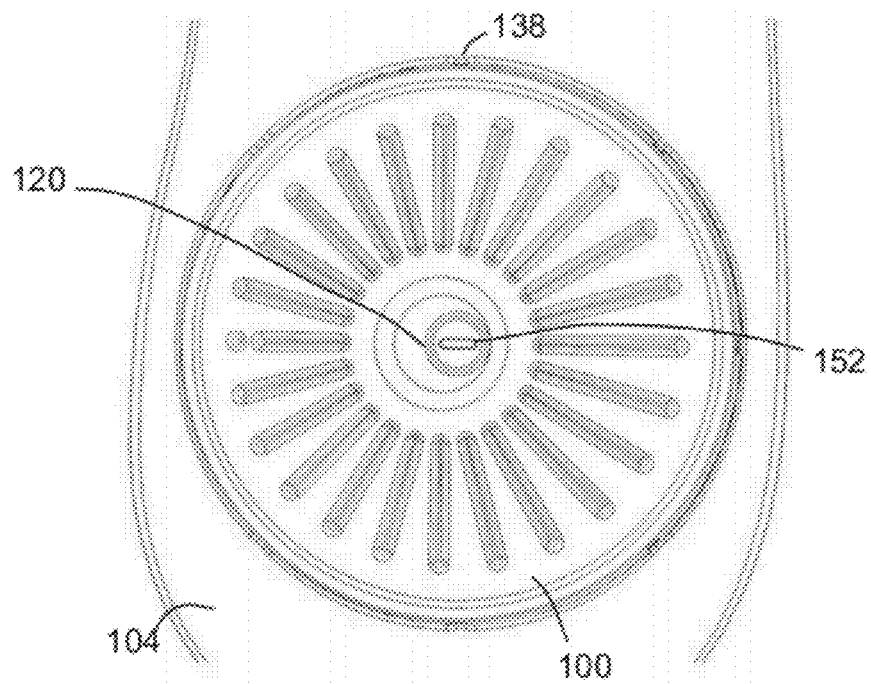
FIG. 7 is a top view of an asymmetric conical disk.
Figure 8:
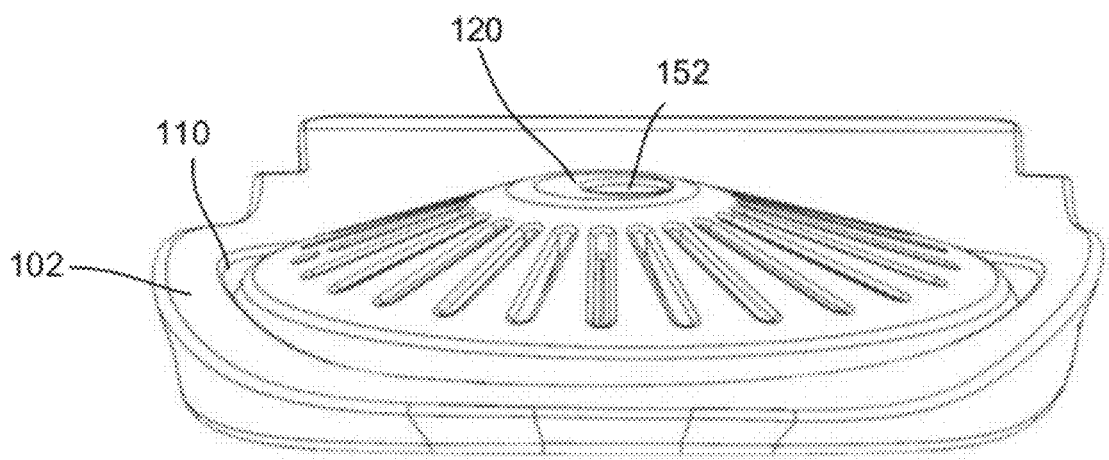
FIG. 8 is a slightly elevated back view of a conical disk.

An alternative embodiment of an asymmetric conical disk 150 is shown in FIGS. 7 and 8. FIG. 7 shows a top view of the asymmetric conical disk. The apex 120 is not at the centre of the disk. As a result when the disk is rotated the position of the apex relative to the sole will move. The disk may be rotated by means of an engagement element 152 preferably located at or near the centre of the disk.

Positive or negative Poisson's ratio materials may be used as live hinges in high strain areas of the conical disk as long as these materials have the ability to form live hinges without failing over repeated cycles (preferably at least 300,000 cycles).

Figure 9:
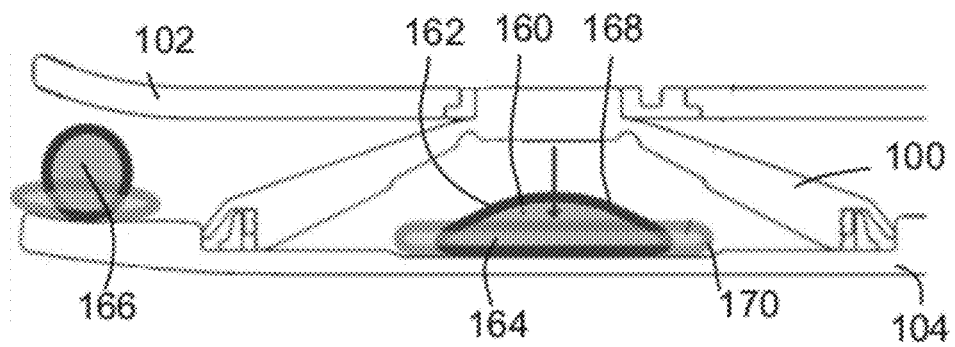
FIG. 9 is a section side view of a conical disk between an insole and an outsole, having a damper comprising a flexible container containing a viscous fluid within the conical disk and another such damper between the insole and the outsole outside the conical disk.

FIG. 9 is similar to FIG. 1 but showing additional dampers, one within the conical disk 100 and another outside the disk but between insole 102 and outsole 104. A viscous liquid, fluid, slurry, powder or other material or combination of materials 160 with little or no ability to return to its/their original shape such as, but not limited to, polysiloxane-boron, silica particles suspended in polyethylene glycol and/or other types of shear-thickening fluids with non-Newtonian behavior, (also referred to as dilatant fluids) are contained within a flexible and preferably extensible material 162 such as but not limited to a polyurethane container which acts to return the container and contents to its original shape after compression deformation. The viscous material must be stiff enough to provide adequate damping through all or the final part of the shoe sole and PowerDisk compression. The flexible/extensible container must be stiff enough to return the container to near it's original shape before the next compression. A time of 0.4 seconds should be adequate for most walking and jogging applications. Longer or shorter return times may also be used for various applications. The ideal combination of viscous material characteristics and container material characteristics is best determined by testing in actual running or walking conditions.

The original shape of the damping material is defined primarily or completely by the flexible container. Compression stretches the container and dissipates energy primarily via deformation of the viscous fluid. The flexible/elastic container returns the viscous material to (or nearly to) its original shape before the next compression. In FIG. 9, a first damper 164 of this design is shown within the conical disk 100 to resist compression of the conical disk as it nears maximal compression. The damper is shown in an uncompressed position 168 (darker) and a compressed position 170 (lighter). A similar damper 166 may be used with the same or a different shape or configuration on the outside of the PowerDisk such as behind the PowerDisk to provide initial impact energy dissipation. This damper concept can be used with many conceivable configurations of the PowerDisk invention. Illustrations shown here are intended as examples of how it can be used. The damping element is preferably constructed so compression by a light person will allow the PowerDisk to reach adequate compression to store footstrike energy through the mid stride. The disk will also preferably be designed to allow compression below this position so additional damping can be provided by the further and more complete compression of the damping element/s shown in this figure. The same principle also holds true for other damping elements.

Preferably additional foam and/or deformable material or combination of materials is used to act as a full bump stop by increasing the spring force required to compress the conical disk at or near full compression. This bump stop may be of many different materials or configurations and preferably has a damping quality to it as well as an increasing spring force quality at full compression.

Multiple springs may be included in a shoe, for example in arrays 200, 220, 240 and 260 of FIGS. 10-13. Each array 200, 220, 240 and 260 comprises multiple springs that have a spring rate that varies with the compression of the sole of a shoe to provide a reducing force resisting compression over at least a portion of the spring range of travel as the sole compresses. It will be appreciated that the reference to a spring rate means the coefficient that relates the force applied by the spring to displacement of the spring. Thus, the exemplary arrays are able to return a portion of the compression energy to the user after the user's center of gravity is forward of the user's heel (when the user is walking forward). Each spring in the arrays may be formed of rigid members 202, 222, 242 and 262 respectively and respective extensible members 204, 224, 244 and 264 that are stretched when the rigid member moves under compression from a foot. In the arrays 200, 220, 240 and 260 the springs are arched non-conical hinged springs. The rigid members 202, 222, 242 and 262 are hinged to allow the rigid members to flatten on pressure applied to the apex members formed between the rigid members.

Figure 11:
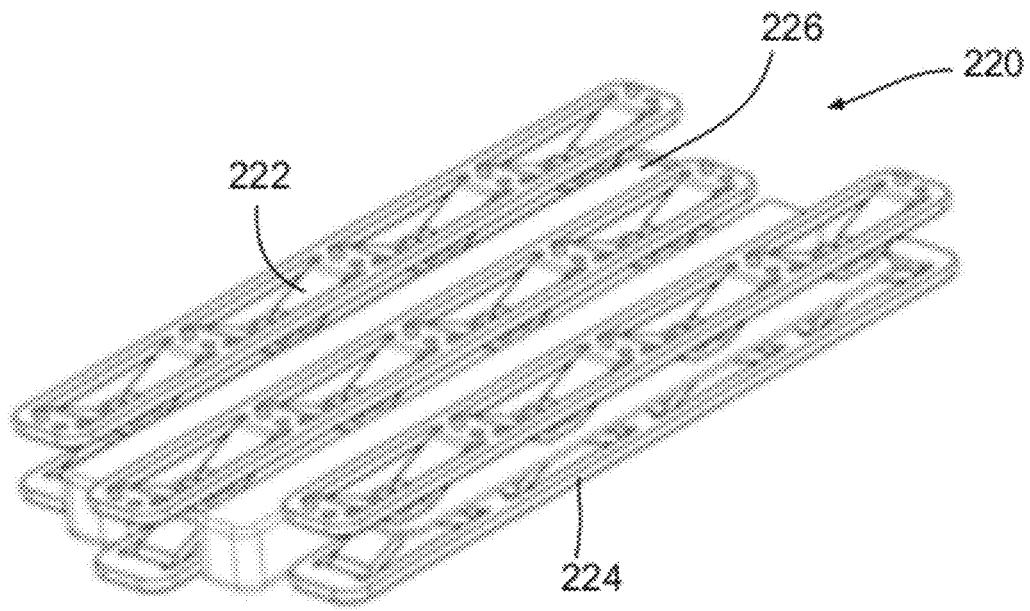
Figure 12:
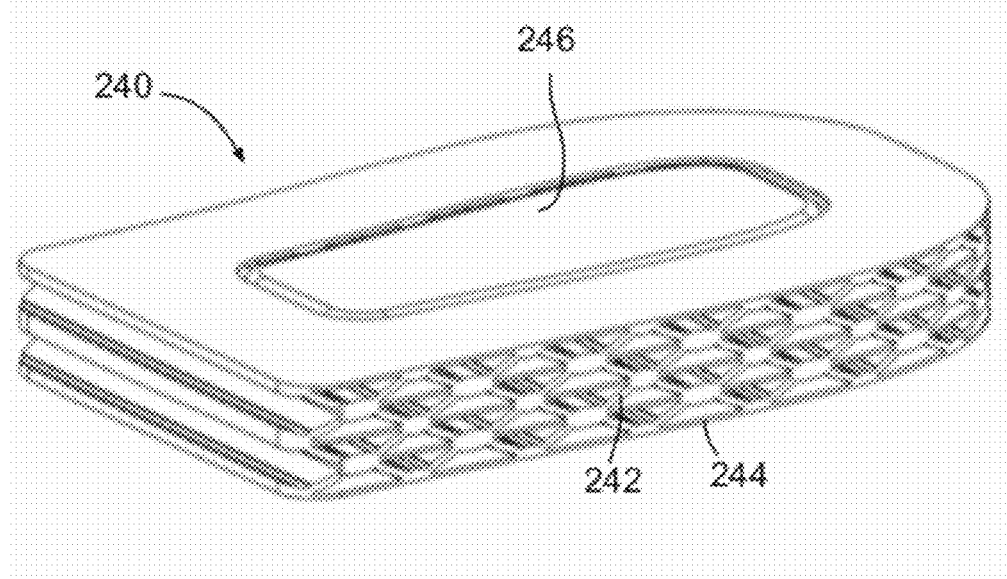

In FIG. 11, the arrays 220 are linear arrays separated by linear dampers 226 that are exterior to the individual springs of the arrays. In FIG. 12, the array 240 forms an annulus around a central damper 246. The dampers 226 and 246 are biased dampers that compress with compression of the arrays 220 and 240 but, during foot lift-off of a wearer, subsequent expansion of the dampers 226 and 246 lags the expansion of the respective springs 220 and 240. The dampers 226 and 246 are oriented to oppose compression of the array as the springs compress towards maximum compression. The springs of the arrays 200, 220, 240 and 260 provide a more even distribution of forces across the length and/or width of the shoe sole, and also to provide a graduated and progressive compression force as compared with a single spring. Lateral or vertical variation of spring material or spring member thickness or hinge member angles may vary to cause certain areas or levels to compress first. When different levels compress first, a more smooth and progressive compression may be provided which stores energy during mid stride even if the sole is not completely compressed. Thus, the springs of the arrays may have spring rates that vary and depend on the location of the spring in the array.

Figure 10:
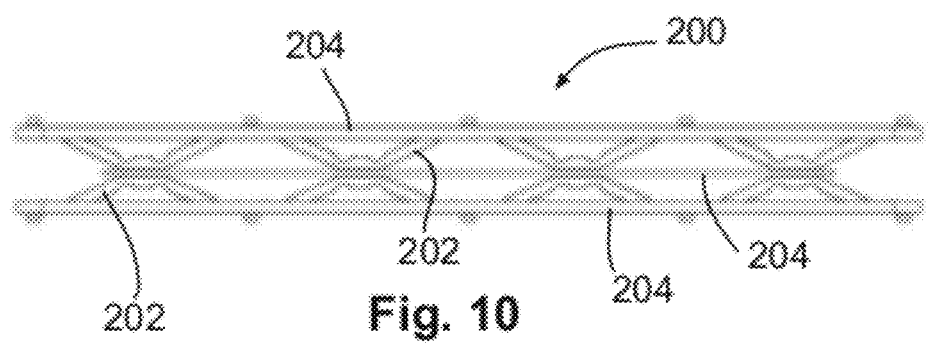
FIGS. 10-13 show several possible arrays of springs.
Figure 13:
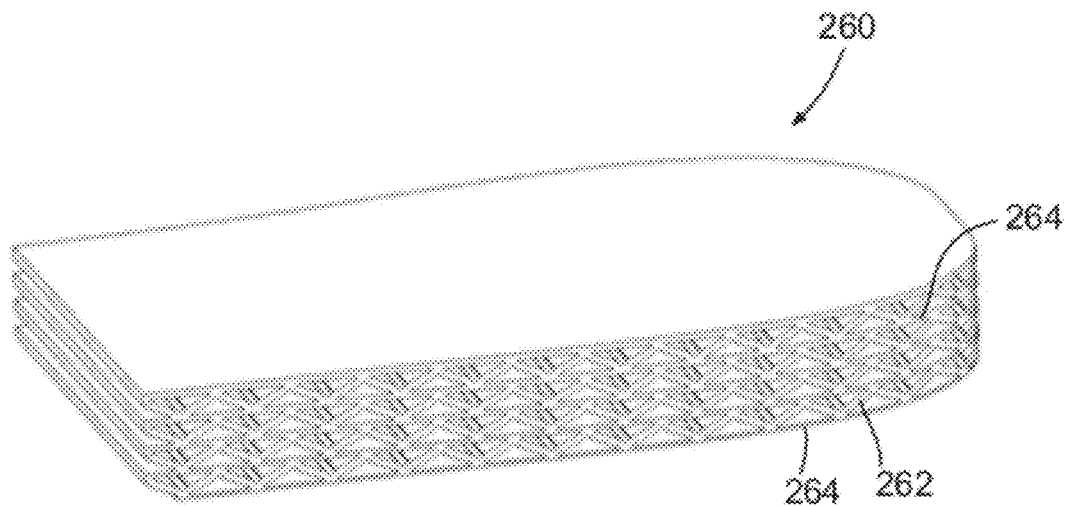

The array 200 of FIG. 10 may use a rigid material (preferably polypropylene but many other materials may be used) as a single hinged member or as a series of connected (shown) or unconnected (not shown) hinged members 202 which are loaded in compression which must elastically deform a central member 204 which is loaded in tension and may be of the same material but is preferably a material such as delrin with more resilient elastic properties. The array 220 of FIG. 11 is preferably used in combination with (and staggered with) one or more other assemblies, also forming an array, and also in combination with a compression biased damping element as shown. In an array, for example the array 240 of FIG. 12 a number of increasing/decreasing spring force components may be combined into one piece of material. The rigid hinged compression members 242 are thicker than the elastic tension members 244 and in this way, an increasing/decreasing spring force is achieved within each individual "cell" during compression. Furthermore, the lower springs of the array 240 may be made easier to compress (either as a result of thinner elastic members, and/or shallower angles between hinged members) so the lower cells compress with less force than the upper cells. Other distributions of greater or less force from top to bottom or side to side or front to back may also be used with different effects. An array made of all the same material is well suited to extrusion process manufacturing for low cost. It also has the benefit of working over a wide range of user weights and foot strike forces. The material is preferably polypropylene but many other materials such as, but not limited to, polyurethane may also be used. In the array 260 of FIG. 13, the hinged members 262 of each spring pivot on the elastic member 264 of an adjacent spring. In this way, a specific effect can be achieved where the springs of the array 260 work together with adjacent springs to affect the spring force as various springs are compressed. As shown in FIG. 13, the elastic members 264 which are loaded in tension are preferably progressively thicker (and/or the angle of the hinged members 262 becomes progressively steeper) toward the top. The material is preferably polypropylene but many other materials such as, but not limited to, polyurethane may also be used. The arrays 200-260 may also be constructed at one or more angles for smoother transitions.

Many other variations are possible and have been conceived by the inventor. Only the preferred embodiments and configurations are described here. Parts may also be in other orientations than are shown in the figures. Multiple disks can also be used where a single disk is shown in the figures.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Immaterial modifications may be made to the embodiments described here without departing from what is covered by the claims.

The invention claimed is:

1. A spring comprising:
   a conical disk having a base, a perimeter, and an apex; and
   a ring spring around the perimeter of the conical disk, in which the ring spring is movable in a direction generally perpendicular to the base to adjust the spring force of the conical disk, and
   in which the ring spring engages with an element radially outward from the ring spring in a manner which allows vertical movement and radial expansion of the ring spring but prevents rotational movement of the ring spring relative to the element.

2. The spring of claim 1 in which the ring spring engages with the element radially outward from the ring spring with tongue and groove slots.

3. The spring of claim 1 in which the element radially outward from the ring spring is a damper ring.

4. A spring comprising:
   a conical disk having a perimeter, a base, and an apex;
   a damper ring around the perimeter of the conical disk, in which when the conical disk is compressed the damper ring is caused to expand; and
   a ring spring around the perimeter of the conical disk, in which the ring spring is movable in a direction generally perpendicular to the base to adjust the spring force of the conical disk, and the damper ring is radially outward from the ring spring, the damper ring providing a damping resistance that varies depending on the position of the ring spring in the direction generally perpendicular to the base.

5. The spring of claim 4 in which the damper ring has a cross sectional thickness that varies over the direction of movability of the ring spring.

* * * * *